K. O. S. THORS.
FEEDING DEVICE FOR ROTARY APPARATUS.
APPLICATION FILED OCT. 27, 1909.
991,183.
Patented May 2, 1911.
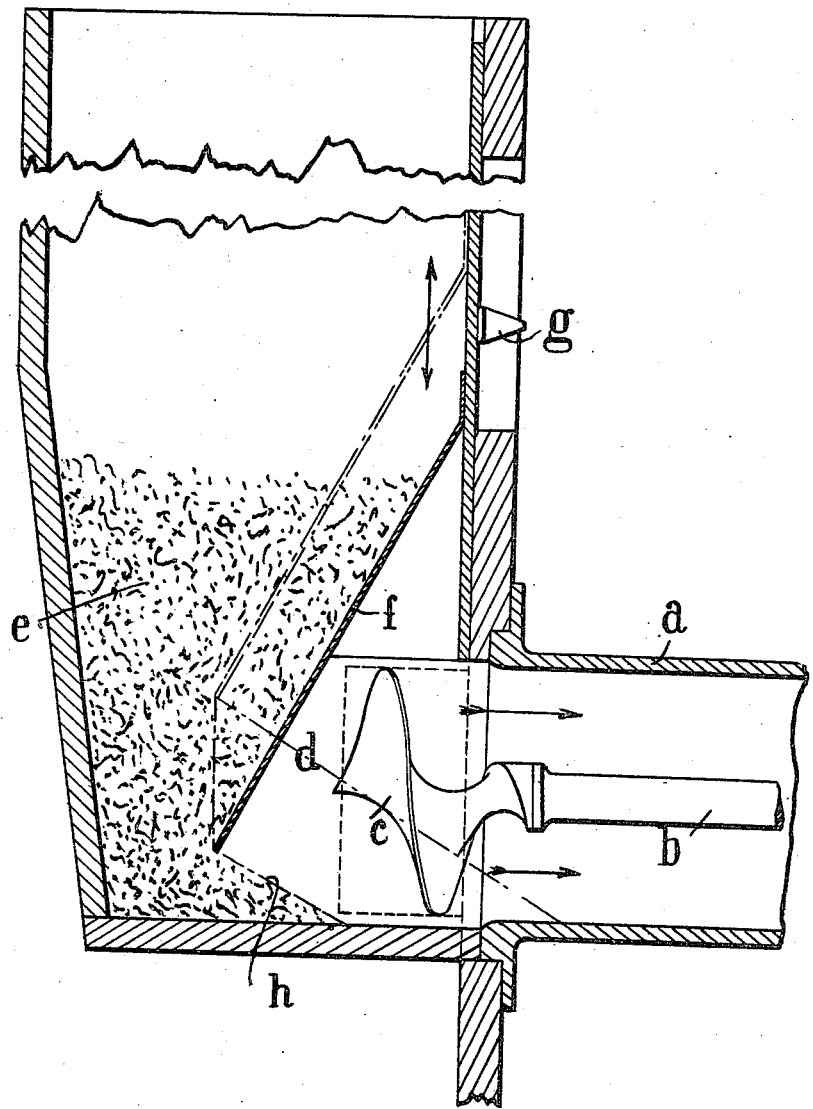

UNITED STATES PATENT OFFICE.

KARL OTTO SAMUEL THORS, OF STOCKHOLM, SWEDEN, ASSIGNOR TO A. KARLSON, METALL. & MASKIN AKTIEBOLAG, OF STOCKHOLM, SWEDEN.

FEEDING DEVICE FOR ROTARY APPARATUS.

991,183.      Specification of Letters Patent.      Patented May 2, 1911.

Application filed October 27, 1909. Serial No. 524,863.

*To all whom it may concern:*

Be it known that I, KARL OTTO SAMUEL THORS, engineer, citizen of Sweden, residing at Stockholm, Vasagatan 7, have invented certain new and useful Improvements in Feeding Devices for Rotary Apparatus; and I do hereby declare the following to be a full, clear, and exact description of the invention, such as will enable others skilled in the art to which it appertains to make and use the same.

My present invention has for its object a transporting device for such materials, as cannot without aid flow through a pipe or similar conductor, such as granular substances for instance corn and the like.

The invention is shortly characterized thereby that the material, which is to be transported, is brought to occupy its sloping angle and that a screw or any other transporting device is arranged in close proximity to the sloping surface of the material, means being provided for adjusting the said surface in relation to the screw. The greater the part of the screw which is at work in the material, the greater will be the quantity transported by the screw.

In the drawing an embodiment of the invention is shown.

*a* indicates the pipe, through which the material is transported and *b* a rotating shaft provided with a screw *c*.

*e* indicates the receiver containing the material and communicating with the pipe. The screw is arranged in the compartment *d*, separated from the receiver *e* by a separating wall or partition *f*, the lower end of which is located at some distance above the bottom of the receiver, thereby allowing the material to occupy its sloping angle. The partition *f*, as indicated by dotted lines, may be adjusted vertically up and down in guideways on the proximate wall of the hopper, an index *g* serving to mark the degree of such adjustment. This last may be continued nearly to the bottom of the hopper without contact with the screw *c*, which also remains free to turn so that these two parts do not interfere with each other, whatever the position to which such partition may be adjusted. This permits the supply of granular material to be regulated so that very little will pass to the screw.

When the receiver *e* is filled with the material, which is to be fed forward into the pipe *a*, said material will from the lower edges of the wall *f* form in the compartment *d* a natural sloping surface in the direction of the line *h*. In the position shown on the drawing the screw *c* will only work to a small extent in the material and accordingly only a small quantity of the material will be transported through the pipe *a*. In proportion as the wall *f* is raised the line *h* will be elevated, causing a greater part of the screw to work in the material, and accordingly a greater quantity of the latter to be fed into the pipe *a*.

Claims.

1. In combination with a hopper and an outlet passage into which the said hopper discharges at the bottom of the latter, a vertically movable inclined partition constituting the lower part of the wall of said hopper on the discharging side and adapted to regulate the size of the discharge opening and a screw arranged in the space below said partition on the discharge side but sufficiently removed from said partition to permit the free vertical adjustment of the latter up and down in front of the end of said screw, and the free rotation of said screw in any position of said partition.

2. In combination with a hopper and an outlet passage into which the said hopper discharges at the bottom of the latter, a screw arranged in said passage, a vertical plate movable up and down along the inner face of a wall of said hopper, means for raising and lowering said plate from the outside of said hopper, an inclined partition attached at its upper end to said plate and extending inwardly and downwardly therefrom in front of the said screw substantially as set forth.

In testimony whereof, I have signed my name to this specification in the presence of two subscribing witnesses.

KARL OTTO SAMUEL THORS.

Witnesses:
ANNA SÖDERSTRÖM,
HARRY ALBIHN.